US008204509B2

(12) United States Patent
Cavalli et al.

(10) Patent No.: US 8,204,509 B2
(45) Date of Patent: Jun. 19, 2012

(54) METHOD OF AND DEVICE FOR AIR TIME MANAGEMENT IN MULTI-ACCESS CHANNEL NETWORKS

(75) Inventors: Giulio Cavalli, Milan (IT); Claudio Santacesaria, Milan (IT); Annalisa Tomasetta, Robbiate (IT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 496 days.

(21) Appl. No.: 12/439,480

(22) PCT Filed: Aug. 30, 2007

(86) PCT No.: PCT/EP2007/007585
§ 371 (c)(1),
(2), (4) Date: Jun. 30, 2009

(87) PCT Pub. No.: WO2008/025549
PCT Pub. Date: Mar. 6, 2008

(65) Prior Publication Data
US 2010/0022252 A1  Jan. 28, 2010

(30) Foreign Application Priority Data
Aug. 30, 2006  (EP) ...................................... 06425600

(51) Int. Cl.
*H04W 72/00* (2009.01)
*H04J 3/16* (2006.01)
(52) U.S. Cl. .......................... 455/453; 370/437; 370/328
(58) Field of Classification Search .................. 370/335, 370/328, 437, 469, 346, 347, 420, 532, 449, 370/493, 294; 455/434, 453, 437, 11.1, 13.2
See application file for complete search history.

(56) References Cited

U.S. PATENT DOCUMENTS

| 2006/0002336 A1* | 1/2006 | Stanwood et al. | 370/328 |
| 2006/0013168 A1* | 1/2006 | Agrawal et al. | 370/335 |
| 2006/0193338 A1* | 8/2006 | Zheng et al. | 370/437 |

FOREIGN PATENT DOCUMENTS

| WO | WO 02/19682 | 3/2002 |
| WO | WO 2005/055437 | 6/2005 |

OTHER PUBLICATIONS

Alavi, H. S. et al., A Quality of Service Architecture for IEEE 802.16 Standards, Asia-Pacific Conference on Communications, Perth. Western Australia, 249-253 (2005).

\* cited by examiner

*Primary Examiner* — Kiet Doan
(74) *Attorney, Agent, or Firm* — Laurence A. Greenberg; Werner H. Stemer; Ralph E. Locher

(57) ABSTRACT

An air time management method and apparatus for multi-access channel networks is provided, suitable for use when terminal stations operate with adaptive modulation. A specific modulation (default modulation) is defined for each terminal station (in a planning phase. During operation, when bandwidth is to be allotted to an uplink or downlink communication, a base station checks whether the concerned terminal station is operating with a modulation more robust (e.g. less efficient) than the default modulation. In so, the base station allocates a time slot to the communication that has a duration sufficient for transmitting less than all of a particular set of data with the default modulation. If not, the base station allocates a time slot to the communication that has a duration sufficient for transmitting all of a particular set of data with the current modulation.

12 Claims, 3 Drawing Sheets

METHOD OF AND DEVICE FOR AIR TIME MANAGEMENT IN MULTI-ACCESS CHANNEL NETWORKS

PRIORITY CLAIM

This application is a national stage application of PCT/EP2007/007585, filed Aug. 30, 2007, which claims the benefit of priority to European Application No. 06425600.1, filed Aug. 30, 2006, the contents of which hereby incorporated by reference.

TECHNICAL FIELD

The present disclosure relates to wireless communication systems, and more particularly to a method of and a device for air time management in multi-access channel networks with adaptive modulation.

BACKGROUND

One aspect of a multi-access channel network is the resource allocation among the active users. As an example of a multi-access channel, the following scenario is considered: a point-to-multipoint network characterized by a base station (or a master station) that coordinates the communications among several terminal stations (or subscriber stations). Examples of point-to-multipoint networks are wireless access networks conforming to IEEE Standard 802.16, networks conforming to ETSI standards known as ETSI HiperLAN, ETSI HiperMAN, ETSI HiperAccess, and 3GPP networks. By way of example only, where necessary, reference will be made to IEEE Standard 802.16.

In such a scenario, the base station assigns time slots for each terminal station defining, in this way, the accesses to the multi-access channel. In the assigned slot, the terminal station transmits data with a specific modulation that can change in real time depending on the channel conditions: the transmission efficiency of each terminal station is bounded by the used modulation robustness. For instance, if the environmental conditions are good (e.g. short distance between the base station and a terminal station and line of sight), a terminal station can transmit with a more efficient modulation, sending a great amount of data in a short time slot. On the other hand, if a terminal station is far from the base station, the terminal station may transmit with a more robust modulation, at the expense of efficiency (e.g., it may take a relatively longer time to transmit relatively lesspayload information).

The operator analyzes and provides a territorial planr to define the maximum number of terminal stations that can be supported by the system and the maximum channel bit-rate.

Another aspect that the operator may take into account is the Quality of Service (QoS) associated with different classes of traffic. In fact, the sizes of the time slots assigned by the base station typically depend on the QoS parameters defined for each class of traffic. For instance, the above mentioned standard IEEE 802.16 specifies four classes of traffic, namely Unsolicited Grant Service, Real-time Polling Service, Non-real-time Polling Service and Best Effort, in decreasing order of QoS requirements, and hence in decreasing order of scheduling priority.

Each class of traffic is well known to the skilled in the art and can be found in the standard. Air time management is applicable to variable rate connections getting bandwidth on request, e.g. connections relevant to Real-time Polling services, Non-real-time Polling services and Best Effort services. The first two kinds of connections will also be denoted by the common term of "guaranteed bandwidth connections".

In particular, for guaranteed bandwidth connections, two QoS parameters are specified: Minimum Reserved Traffic Rate (MRTR), which represents the guaranteed portion of data rate handled by the network, and Maximum Sustained Traffic Rate (MSTR), which represents the peak data rate. The MRTR portion is processed with the highest priority; the surplus portion (e.g. the difference between MSTR and MRTR) is served with lower priority, and only if remaining bandwidth is available.

For best effort connections, only the MSTR parameter is specified. Therefore, the traffic of best effort connections is treated as a surplus (equal to MSTR).

An air time management method for resource allocation to different terminals is disclosed in U.S. Pat. No. 6,564,047 B1, which is incorporated herein by reference. In order to coordinate access among active users, the time slots assigned by the base station are agreed and limited in accordance to the services each terminal station has to support. The limitation refers to the air time duration allocated to the terminal stations. Therefore, the terminal transmits data in the assigned slot, and the duration of the assigned slot is specified by the operator during the planning definition and is therefore fixed. The method is therefore not applicable to the case of adaptive modulation channels, as used in the above mentioned multi-access channel networks.

In adaptive modulation channels, modern planning methods adopted by operators take into account the channel maximum bit-rate associated with either the most robust modulation or the estimation of the mean modulation in order to define the maximum number of terminal stations supported by a cell.

A planning based on the most robust modulation represents the worst case. Such a planning assumes that all terminal stations always transmit with the most robust modulation and thus ensures that the channel can support the negotiated data traffic for all stations. However, this worst case scenario is not realistic (it is very unlikely that all terminal stations transmit with the most robust modulation) and is the result of an underestimation of the system efficiency. Consequently, a certain amount of resources will generally remain unused, because a number of terminal stations transmit with a more efficient modulation that consumes fewer resources, and there is a corresponding loss of revenues for the operator.

In a planning based on the estimation of the mean modulation, it is possible that some terminal stations will transmit with a less efficient (e.g. more robust) modulation than the expected one. For instance, a terminal station that is very close to the base station is expected to transmit with a very efficient modulation. If the above mentioned terminal station transmits with a more robust modulation, due to factors out of the control of the operator, e.g. a wrong antenna orientation or not line-of-sight positioning, the channel planning is not reliable and, unlike the first case, the operator overestimates the actual efficiency of the system. Since the channel is shared by all terminal stations, the scarcely efficient station steals bandwidth that, according to the planning, should have been allocated to other stations.

SUMMARY

Thus, there is a need for an air time management technique for multi-access channel networks in which the physical layer exploits adaptive modulation, which technique results in a good exploitation of the available resources and prevents, at least to some extent, terminal stations operating less efficiently than expected from stealing resources to the stations operating as or better than expected.

More specifically, a specific modulation (default modulation) is defined for each terminal station in a planning phase. During operation, When bandwidth is to be allotted to an uplink or downlink communication, the base station checks whether the concerned terminal station is operating with a modulation (or, more generally, a physical layer operating mode) more robust (e.g. less efficient) than the default one. In the affirmative, the base station allots to the communication a time slot whose duration is as needed for transmitting all data with the default modulation. In the negative, the base station allots to the communication a time slot whose duration is as needed for transmitting all data with the current modulation.

Thus, a modulation associated to each terminal station is defined in place of a unique estimation of modulation associated to the channel, as in the conventional planning methods disclosed above. By applying the algorithm disclosed herein, a station that transmits with the default modulation or a better one is assigned the time (and hence the bandwidth) needed for transmitting all data traffic. This assigned time could be shorter than planned if the current modulation is more efficient than the default one. An inefficient terminal station, e.g. a terminal station that transmits with a more robust modulation than the default one, is penalised by being allocated less bandwidth than needed to send all data.

The method can be applied to surplus traffic or to both guaranteed and the surplus traffic.

In the first instance, the guaranteed portion of the traffic is respected under any condition. Yet, since the MRTR is scheduled with higher priority, and channel bandwidth is shared by all terminal stations, those terminal stations that consume unexpected time resources would penalise those terminal stations that are working as planned or better.

If the air time management is applied also to the MRTR traffic portion, initially the less efficient stations cannot transmit all traffic. The MRTR portion of traffic that could not be scheduled due to the air time management will then be served with the surplus bandwidth portion, provided such surplus bandwidth is available. Thus, in a non-congested scenario, MRTR is ultimately met also for less efficient stations. Instead, in a case of congestion, when all channel bandwidth is already allocated, even the MRTR parameter cannot be met for terminal stations that are less efficient than expected. On the other hand, the less efficient terminal stations do not subtract resources that should be allocated to other terminal stations that are working fine.

The disclosed system also provides a device for implementing the method. The device includes:

a memory for storing information about default modulations assigned, in a planning phase, to the terminal stations;

a comparator for receiving information about a current modulation used by a terminal station concerned in a communication to which air time is to be allotted, and comparing such current modulation to the default modulation of that station; and a controller connected to the comparator for determining a length of a time slot to be allotted to a communication, the length being such as to meet a bandwidth need for the communication if the current modulation is as efficient as, or more efficient than, the default mode, whereas, if the currently used modulation is less efficient than the default mode, the length is determined to be the length that would meet the bandwidth need if the station would operate with the default modulation.

The comparator and the controller are controlled by a traffic priority evaluator in such a manner that a station operating with a modulation less efficient than the default mode is served as if it operates with the default mode only in case of low priority traffic, or is served as if it operates with the default mode in case of both high priority and low priority traffic.

BRIEF DESCRIPTION OF THE DRAWINGS

Further details, characteristics and advantages of the disclosed system will become apparent from the following description of a preferred embodiment, given by way of non-limiting example and illustrated in the accompanying drawings, in which.

DETAILED DESCRIPTION OF EXEMPLARY EMBODIMENTS

Figure 1:
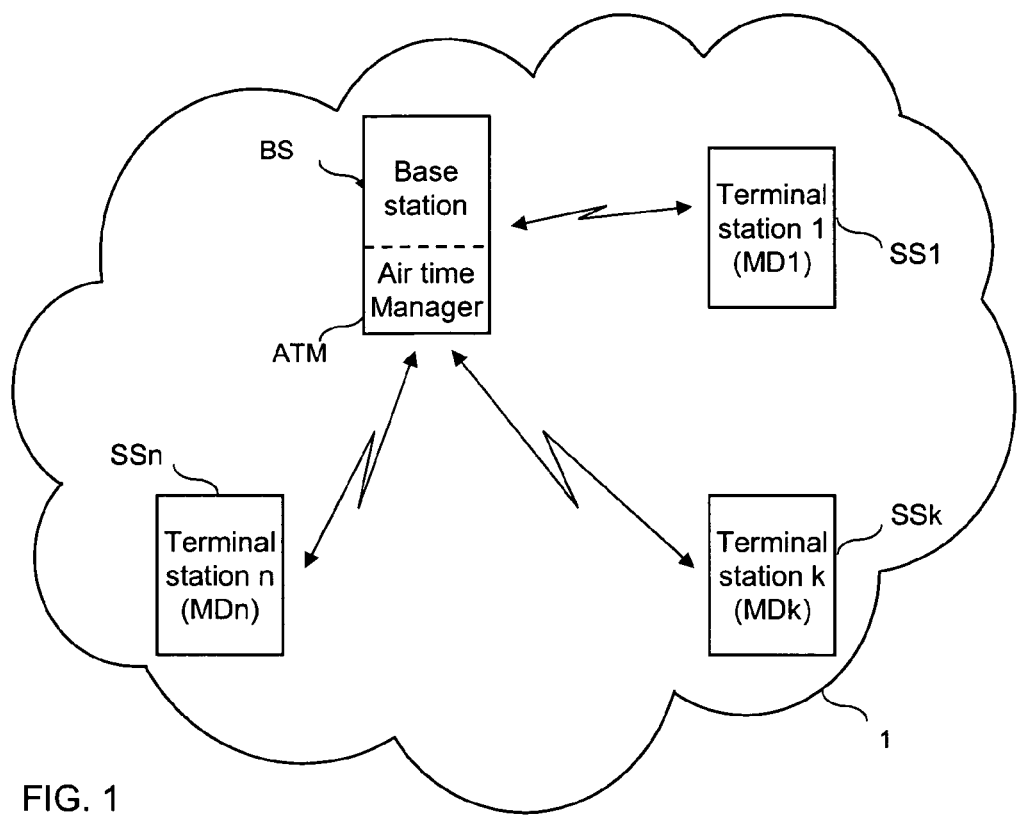
FIG. 1 is a schematic block diagram of an example multi-access channel network.

Referring to FIG. 1, there is schematically shown an example multi-access channel network, with a base station (or master station) BS and a number of terminal stations (or subscriber stations) SS1 . . . SSk . . . SSn. Base station BS has a certain coverage area 1 and coordinates communications among the terminal stations SSi (i=1 . . . n). In particular, BS assigns in real time, based on suitable measurements carried out by the base station itself (in uplink) or by the terminal stations (in downlink), the modulation a terminal station is to use for a communication. Moreover, BS determines the air time to be allotted to transmission of a data burst based on the instant modulation and on a default modulation MD1 . . . MDk . . . MDn (and hence a default data rate) determined for each terminal station SS1 . . . SSk . . . SSn in a planning phase.

Air time management is performed by an air time manager ATM, which is part of the base station controller.

Data traffic is transported from the terminal stations SS1 . . . SSn to base station BS on connections allotted each to a service having a specific requirement in term of quality of service (QoS). Referring to IEEE Standard 802.16, the disclosed system is concerned with management of connections relevant to Real-time Polling Services, Non-real-time Polling Services and Best Effort. The first two types of connections include, scheduling parameters to be met, Minimum Reserved Traffic Rate (MRTR) and Maximum Sustained Traffic Rate (MSTR), whereas the other types of connections typically include MSTR only.

In operation, for Real-time Polling Services and Non-real-time Polling Services, base station BS allots higher priority to the MRTR portion of the data traffic and handles the surplus traffic, up to MSTR, only if bandwidth is available. Best Effort connections are handled as the surplus traffic of the other two types of connections.

The service parameters can be met for all stations if the stations operate with their default modulations (or better ones). If, however, for any reason out of the control of the operator, a station uses a more robust modulation, that station consumes too many radio resources and penalises stations operating as planned.

Device ATM implements a method for sharing the available bandwidth among the simultaneously active terminal stations in efficient manner and in such a manner that terminal stations operating less efficiently than expected (that is, using a modulation more robust than the default one and hence needing more time to transmit a certain data traffic) is prevented, at least to a certain extent, from penalising stations operating as expected or better than expected.

The method provides for serving the less efficient stations as if they were operating with the default modulation, and serving the more efficient stations in accordance with their actual modulation (whether it is the default one or a better one).

As described above, the method can be applied to surplus traffic only, so that the guaranteed portion of the traffic is respected in any condition. However, since that portion of the traffic is scheduled with higher priority, and channel bandwidth is shared by all terminal stations, the terminal stations needing longer time intervals would penalise the terminal stations working as planned or better than planned. In the alternative, the air time management can be applied also to the MRTR traffic portion. In this manner, when surplus channel bandwidth is available, the MRTR portion of bandwidth that could not be initially scheduled is served with the surplus portion. Thus, in a non-congested scenario, MRTR is met. Instead, in a case of congestion, when all channel bandwidth is already allocated, even the MRTR parameter cannot be met for terminal stations that are less efficient than expected, but such stations do not subtract resources to other terminal stations that are working fine.

Figure 2:
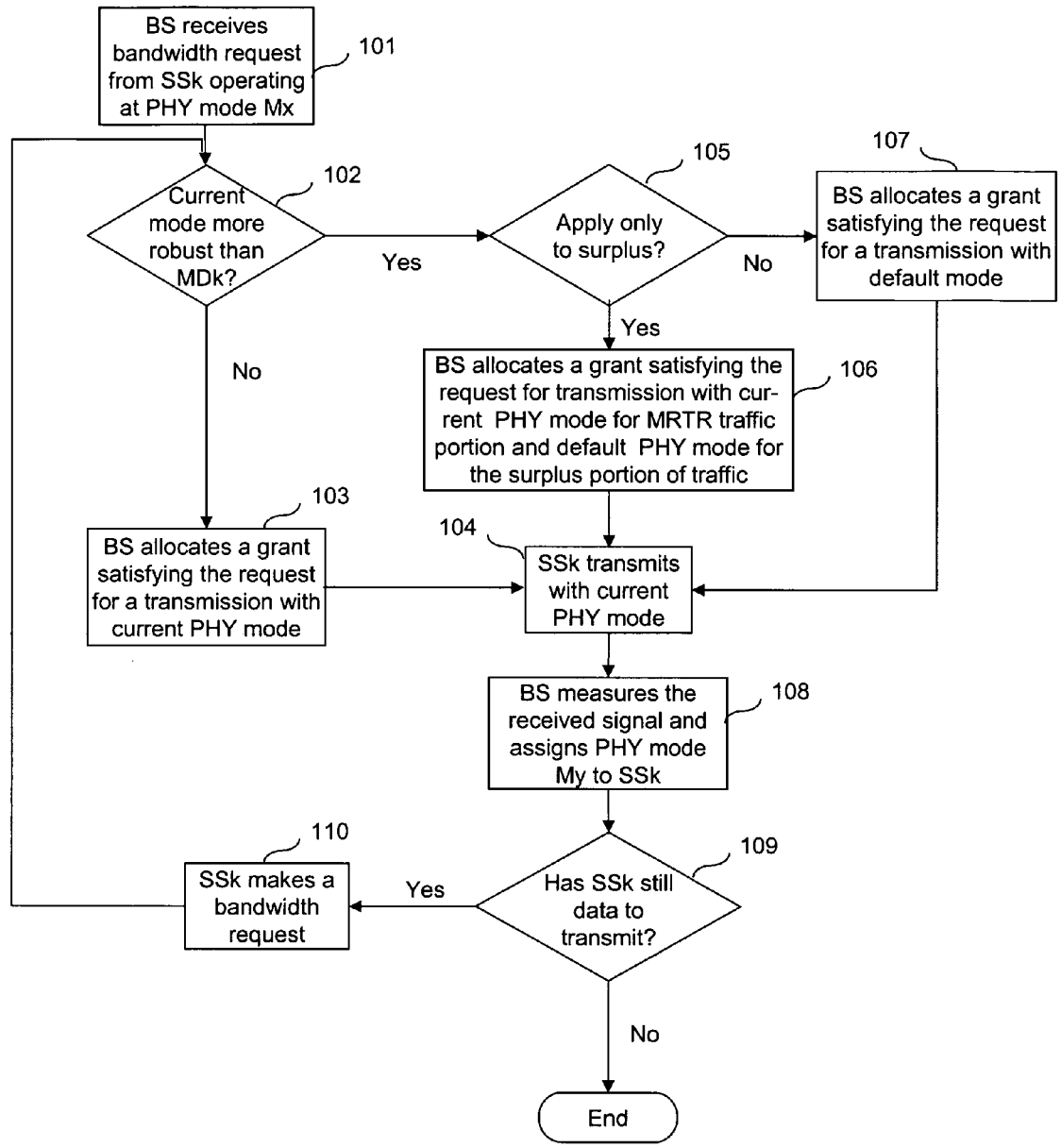
FIG. 2 is a flow chart of an example method for air time management when applied in an uplink direction.

Reference is now made to FIG. 2, which shows the application of the disclosed system in an uplink direction.

The algorithm starts when base station BS receives a bandwidth request from a terminal station, e.g. SSk, which is currently operating with a physical layer (PHY) mode, in particular a modulation, Mx (step 101).

At the subsequent step 102, base station BS checks whether modulation Mx is more robust than default modulation MDk allotted to SSk. In the negative, base station BS allocates SSk an air time interval long enough to satisfy the request with the current modulation Mx (step 103). To satisfy the request, BS takes into account the available bandwidth and the scheduling algorithm, which generally is implementation specific and depends on the QoS of the connection. SSk then proceeds to transmit its data (step 104).

If on the contrary the check of step 102 reveals that SSk is using a more robust modulation than the default one (e.g., a BPSK modulation in place of a 16 QAM modulation), base station BS checks, at step 105, whether the algorithm is to be applied to the surplus traffic portion only. Surplus traffic portion denotes the (MSTR-MRTR) portion of a guaranteed bandwidth connection or the whole traffic of a best effort connection. In the affirmative, the base station allots SSk an air time interval with a length that satisfies the request with the current PHY mode for the MRTR traffic portion (that is, a time slot with the length necessary for transmission of the whole data burst), whereas, for the surplus portion, the length is such that it would satisfy the request if SSk would be operating with the default modulation (step 106). Then, the station transmits its data by using its current modulation, as before.

In the negative, e.g. if the algorithm is applied also to the MRTR traffic portion, the allotted slot has in any case the length that would satisfy the request if SSk would be operating with the default modulation (step 107). Then, the algorithm passes to step 104, as before.

The consequence of allotting to a portion or the whole of the traffic a slot as requested by the default modulation, and not as requested by the current modulation, is that the terminal cannot transmit the whole of a data burst in the slot.

During transmission, base station BS effects, as usual, measurements on the quality of the received signals and, based on such measurements, it assigns the proper physical mode My (possibly different from Mx) to SSk (step 108). If SSk still has data to transmit (output Yes of step 109) it requests bandwidth to the base station (step 110) and the algorithm returns to the check of step 102. If, or when, SSk has no further data to transmit, the algorithm ends.

Figure 3:
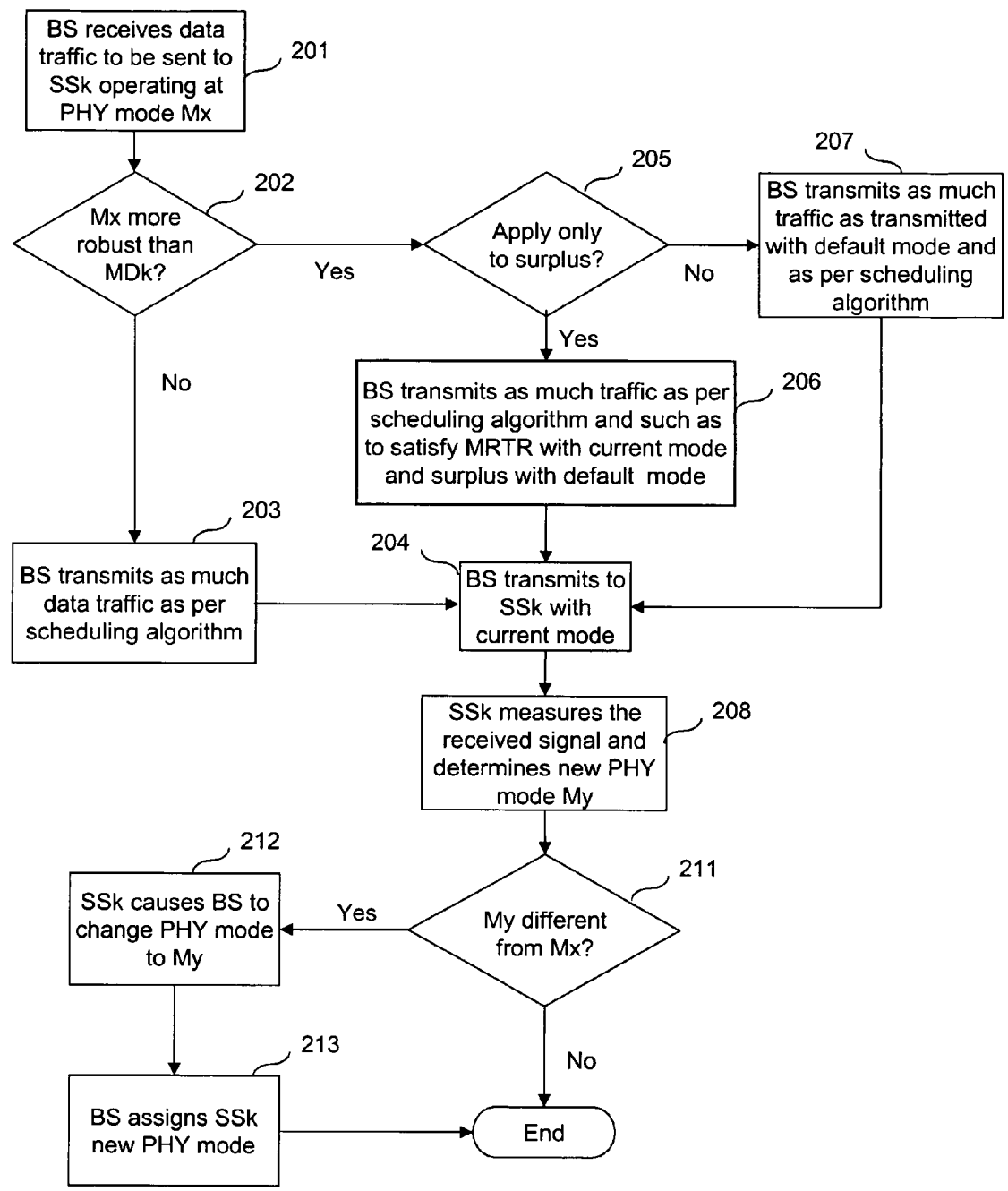
FIG. 3 is a flow chart of an example method for air time management when applied in a downlink direction.

In the case of a downlink transmission, the algorithm is as depicted in FIG. 3. Steps 201 to 208 substantially correspond to steps 101 to 108 of FIG. 2, the difference being that now transmission is carried out by BS when it has data traffic to transmit to SSk, and that BS transmits towards SSk for the time determined as a result of the various decision steps. At step 208, the measurement on the received signal is carried out by SSk.

At step 211, SSk checks whether the newly determined modulation My is different from the previous one Mx. In the negative the process ends. In the affirmative, SSk causes BS to change the assigned PHY mode from Mx to My, either by sending an explicit request or by transmitting the measurement results. Then the process stops and will be resumed when new traffic is to be transmitted to a terminal station.

In conclusion, by using the disclosed system, the duration of time slots allocated by the base station to each terminal station is related with the modulation used by the station. Therefore, the disclosed system takes into account not only the limitation of the air time assigned to each terminal station, but also the transmission efficiency of each active user and their QoS parameters. The air time management algorithm optimises the resources allocation and does not allow inefficient terminal stations to penalise efficient terminal station that either work as planned or better than planned (or, at least, the algorithm limits such a penalisation).

Figure 4:
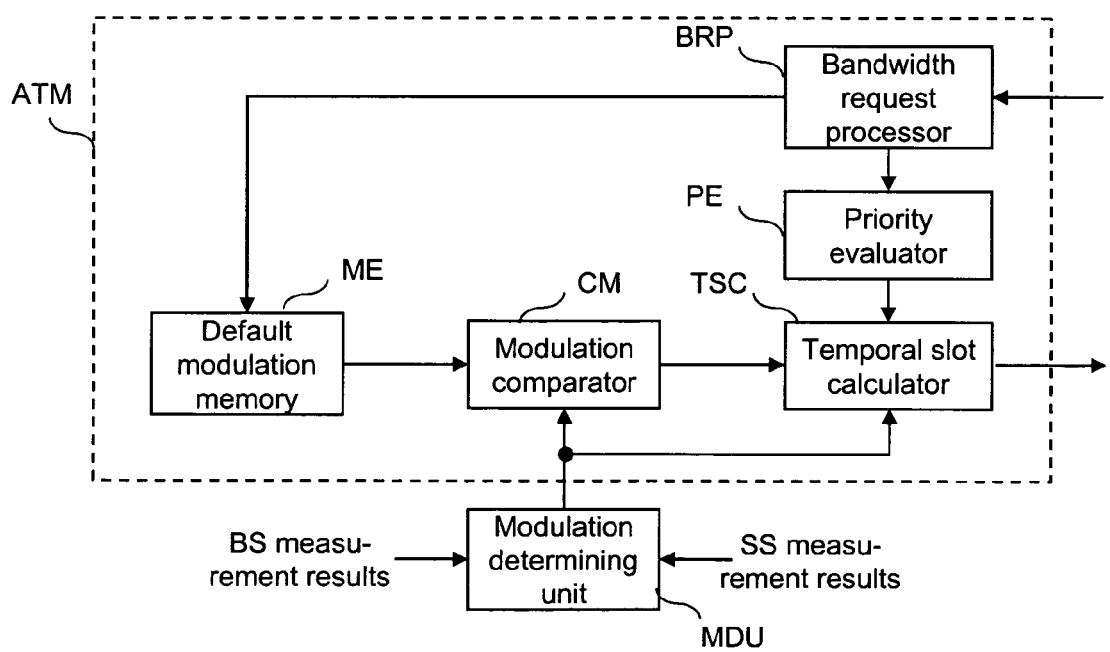
FIG. 4 is a schematic block diagram of an example device for air time management.

FIG. 4 shows a schematic diagram of an example ATM device implementing the above described methods.

The device includes:

a memory or data base of the default modulations ME, ipractice.g. a ROM, written during the planning phase;

a modulation comparator CM, comparing the current modulation used by a terminal station concerned in a communication to which air time is to be allotted, to the corresponding default modulation.

a time slot calculator TSC, driven by the result of the comparison performed in CM, and determining the proper time slot length to be allotted to the communication.

Memory ME is read at the proper address when a bandwidth request processor BRP recognises that bandwidth is to be allotted to a communication from or towards a certain terminal station SSk. The input to BRP is the request coming from SSk or the information that BS has received traffic to be transmitted to SSk. The current modulation is supplied by a modulation determining unit MDU, which can be considered as belonging to the remaining circuitry of a base station controller and determines such modulation based on the results of measurements on the received signals performed by either the base station (in the case of an uplink communication) or by the terminal station.

A priority evaluator PE, connected to bandwidth request processor BRP, determines whether the bandwidth request concerns a guaranteed portion of the data rate or a surplus portion, and controls consequently TSC in a manner depending on whether the algorithm is applied to the surplus traffic only or to the whole traffic.

It is evident that the above description has been given by way of non-limiting example and that changes and modifications are possible without departing from the scope of the invention as claimed.

What is claimed is:

1. A method of air time management on a channel in a multi-access channel network, in which a master station coordinates communications among a number of subscriber stations sharing the channel and operating, at a physical layer of a connection, according to an adaptive operating mode assigned by the master station, the method comprising:
   a) allotting a default physical layer operating mode to each terminal station during a planning phase;
   b) during operation, whenever bandwidth is to be allocated to an uplink or a downlink communication, determining whether the physical layer mode currently used by a subscriber station associated with the communication is less efficient than the default mode of the station; and
   c1) if the currently used physical layer mode is as efficient as, or more efficient than, the default mode, allotting the communication a time slot with such a duration as to meet the bandwidth need; and
   c2) if the currently used physical layer mode is less efficient than the default mode, allotting the communication a time slot having a duration that would meet the bandwidth need if the station would operate with the default mode, whereby only a portion of a data burst can be transmitted.

2. The method as claimed in claim 1, wherein steps b, c1, c2 are repeated whenever the physical layer operating mode is updated.

3. The method as claimed in claim 2, wherein each physical layer mode of operation is associated with a different modulation.

4. The method as claimed in claim 1, wherein each physical layer mode of operation is associated with a different modulation.

5. The method as claimed in claim 1, wherein the connection is a variable rate guaranteed bandwidth connections, for which high priority and low priority traffic is defined, or a variable rate connection for which the whole traffic is considered as low priority traffic.

6. The method as claimed in claim 5, wherein the connection is only for low priority traffic.

7. The method as claimed in claim 5, wherein the connection is for both the high priority traffic and the low priority traffic.

8. The method as claimed in claims 7, wherein for a terminal station currently operating at a physical layer mode less efficient than the default mode, data of the high priority traffic that could not be transmitted during the time slot are handled as if they belonged to the low priority traffic.

9. The method as claimed in claims 1, wherein for a terminal station currently operating at a physical layer mode less efficient than the default mode, data of the high priority traffic that could not be transmitted during the time slot are handled as if they belonged to the low priority traffic.

10. A device for air time management on a channel in a multi-access channel network where a master station coordinates communications among a number of subscriber stations sharing the channel and operating, at a physical layer of a connection, according to an adaptive mode of operation assigned by the master station, the device comprising:
    a memory for storing information about default physical layer modes of operation determined, in a planning phase, for the subscriber stations;
    a comparator for receiving information about a current mode of operation used by a subscriber station concerned in a communication to which air time is to be allotted, and for comparing such current mode of operation to the default mode of operation of that station; and
    a controller connected to the comparator, for determining a length of a time slot to be allotted to the communication, the length being such as to meet a bandwidth need for the communication if the current physical layer mode is as efficient as, or more efficient than, the default mode, whereas, if the currently used physical layer mode is less efficient than the default mode, the length is the length that would meet the bandwidth need if the station would operate in the default mode.

11. The device as claimed in claim 10, wherein the comparator and the controller are controlled by a traffic priority evaluator in such a manner that a station operating with a physical layer mode less efficient than the default mode is served as if it was operating with the default mode only in case of low priority traffic.

12. The device as claimed in claim 10, wherein the comparator and the controller are controlled by a traffic priority evaluating means in such a manner that a station operating with a physical layer mode less efficient than the default mode is served as if it was operating with the default mode in case of both low priority and high priority traffic.

* * * * *